United States Patent
Kuhlmann et al.

(10) Patent No.: US 6,502,772 B1
(45) Date of Patent: Jan. 7, 2003

(54) STATIC CHOPPER FOR THIN WEBS

(75) Inventors: Heinz Kuhlmann, Stadtbredimus (LU); Bert Van Den Bedem, Dupont De Nemours (LU)

(73) Assignee: Dupont Teijin Films U.S. Limited Partnership, Wilmington, DE (US)

( * ) Notice: Subject to any disclaimer, the term of this patent is extended or adjusted under 35 U.S.C. 154(b) by 0 days.

(21) Appl. No.: 09/647,723
(22) PCT Filed: Mar. 19, 1999
(86) PCT No.: PCT/EP99/01836
§ 371 (c)(1), (2), (4) Date: Feb. 6, 2001
(87) PCT Pub. No.: WO99/51407
PCT Pub. Date: Oct. 14, 1999

(30) Foreign Application Priority Data

Apr. 7, 1998 (EP) .............................................. 98400827

(51) Int. Cl.$^7$ ............................................... B02C 19/12
(52) U.S. Cl. ............................ 241/18; 241/38; 241/274
(58) Field of Search ................................. 225/100, 106; 83/98; 241/18, 38, 274, 276, 30

(56) References Cited

U.S. PATENT DOCUMENTS 4,004,738 A * 1/1977 Hawkins ..................... 241/162

* cited by examiner

Primary Examiner—Mark Rosenbaum

(57) ABSTRACT

The invention relates to the chopping of thin webs, and notably to the chopping of edges trims of thin webs. It proposes a chopping device for thin webs, comprising an input section (10) for receiving the web to be chopped; an accelerating section (18) for accelerating the front end of the web received from the input section. Preferably, the device also comprises at least one puncturing means or knife (13) located between the input section and the accelerating section. The invention also relates to a process for chopping thin webs, comprising the steps of providing an incoming web and accelerating the front end of the incoming web so as to tear off said front end, e.g. by causing the web to contact a puncturing device.

9 Claims, 1 Drawing Sheet

STATIC CHOPPER FOR THIN WEBS

FIELD OF THE INVENTION

The present invention relates to the manufacture of thin webs, and more particularly to the destruction of edges trims of thin webs.

BACKGROUND OF THE INVENTION

The invention applies to thin webs, such as webs of PET, PEN, their copolymers, all other polymers, and non-woven or woven sheets or webs; it applies for instance to aluminum sheets or the like; such thin webs or films have a thickness less than several micrometers, e.g. 36 micrometers. Thin webs such as webs of PET, PP, PA, PS, PEN or other polymers are currently manufactured by stretching a web cast through a die in two directions. The web is stretched in a tenter oven, where it is submitted to various heating and setting steps; it is thereafter transferred to a winding machine where it is wound. In the oven, the edges of the web are clamped, and the clamps on each side of the web are moved on diverging rails, so as to carry out transversal (lateral) stretching of the web.

Thus, before the web is wound, its edges are usually trimmed. In existing manufacturing arrangements, the trimmed edges of the web may be chopped into flakes and fed to the extrusion system. A prior art chopping or grinding arrangement is represented on FIG. 1. The edge 1 trimmed from the web is fed into a vertical chute 3. and is thereafter fed into a grinder 5; in the grinder, the trim edges are cut into small pieces or flakes by rotating blades or the like, that rotate in a housing containing fixed knives. The ground edges are sucked by a fan 6, and provided to a cyclone separator 7, where the air is separated from the ground web. The ground web accumulating in the bottom of the cyclone separator may then be sucked by a fan 8, and transported to a mill 9 used for feeding the extrusion system.

Such a system could not be used for chopping thin films of a thickness of 12 micrometers or less. The necessary mechanical clearance between moving knives and fixed knives is such that the web would not be cut by the knives, but would wind around the knives, which leads to jerk of the web; the cyclone separator would have to be over-dimensioned to separate particles or flakes of thin films from the air used for their transport.

Furthermore, such existing chopping systems may create problems if the speed of the knives is higher than the speed of the web; in this case, the chopping system may pull the edge trim, and cause problems with the edge trim slitting system; this leads to uneven edges on the web roll. Finally, in existing systems, the web should be guided to the stationary knife; if the web is caught by the rotating knife, it may cause jerk in the web. Ensuring a precise transport of the web to the fixed knife is however difficult for thin films.

These problems are not encountered only with this type of device and this type of webs. More generally, there exists a need for a chopping device for all types of thin webs. in various uses, e.g. for the finishing of saleable rolls. Accordingly, there exists a need for a chopping system that may operate with thin films; such a system preferably needs to operate at high speed, that is speeds up to several hundreds of meters per minute (several meters per second) with reduced amounts of air. It should not pull the edge trims, so as not to cause any uneven edges on the wound web.

SUMMARY OF THE INVENTION

According to the invention, there is provided a chopping device for thin webs, comprising an input section for receiving the web to be chopped;

an accelerating section for accelerating the front end of the web received from the input section, while the remainder of the web is in the input section.

Preferably, the device further comprises at least one puncturing means located between the input section and the accelerating section. The puncturing means may comprise at least one knife, with a series of needles or blades.

The accelerating section may comprise an accelerating device selected from the group comprised of Venturi effect tubes, rolls, air injection accelerating devices. It may also comprise air pulsing means for pulsing air at the puncturing means.

In one embodiment, the input section comprises air transport means.

The invention also provides a process for chopping thin webs, comprising the steps of providing an incoming web;

accelerating the front end of the incoming web so as to tear off said front end from the remainder of the web.

The process may further comprise the step of causing the web to contact a puncturing device, and/or the step of pulsing air to cause the web to contact a puncturing device.

BRIEF DESCRIPTION OF THE INVENTION

A device embodying the invention will now be described, by way of non-limiting example, with reference to the accompanying drawings, in which FIG. 1 is a schematic view of a prior art chopping system;

BEST MODE OF CARRYING OUT THE INVENTION

Figure 1:
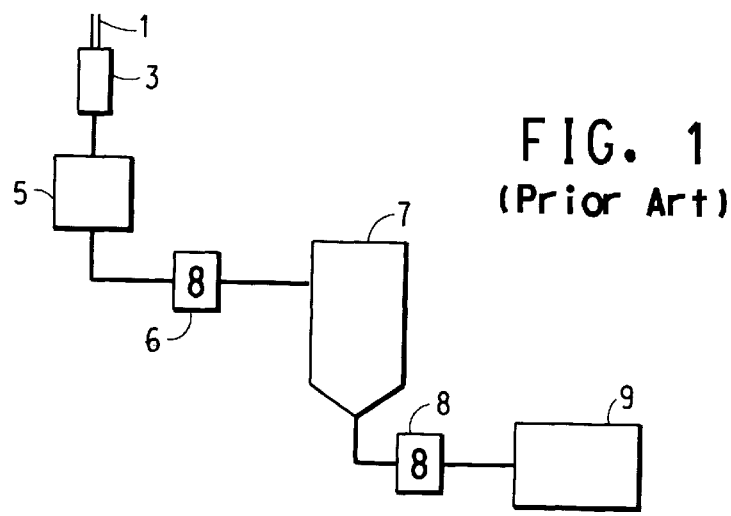
Figure 2:
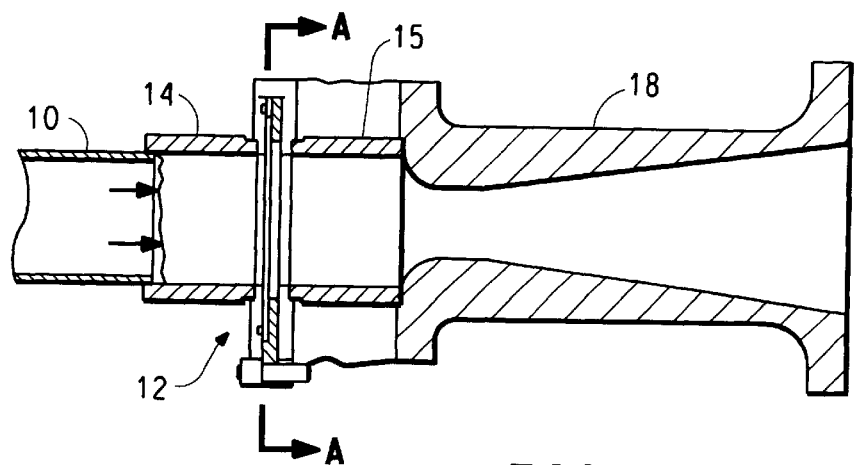
FIG. 2 is a schematic view in cross section of a device according to the invention.

FIG. 2 is a schematic view in cross section of a chopping device according to the invention; the device of FIG. 2 comprises an input duct or pipe 10, through which the edge trim to be chopped is inputted to the device. The edge trim to be chopped is preferably transported along this input pipe by a medium speed flow of air, that is a flow at a speed at least three times the speed of the web, and preferably from 6 to 10 times the web speed. Such a high speed flow causes a constant tensional force on the edge trim slitting device located upstream of the chopping device; this avoids uneven edges on the wound web. For instance, for a web speed of 7 m/s, the air speed in the input duct may be chosen around 60 m/s. The flow of air is obtained by any air displacement means, such as fans, pumps or the like. The input of air to the duct is known per se to the person skilled in the art.

The output of the input duct is connected to a knife section 12, containing at least a knife 13, protruding in the knife section; an embodiment of such a knife is described below in reference to FIG. 3. In the embodiment of FIG. 2, the knife section 12 is comprised of two sections 14 and 15 of ducts, assembled by bolts or the like on each side of a knife 13. The protrusion of the knife in the knife section may be measured by the cross section area of the chopping device at the knife, as compared to the cross section area of the knife section immediately upstream or downstream of the knife; the protrusion of the knife should be sufficient to ensure that the web is at least partly cut or torn; therefore, the area of the knife protruding in the knife section is preferably at least 5% of the cross section area of the knife section. The protrusion of the knife should also be sufficiently small to ensure that an incoming web may always be transported through the knife section 12; this prevents any accumulation or jam of web in the chopping device; preferably, the area of the knife protruding in the knife section is less than 50% of the cross section area of the knife section.

The function of knife 13 is to create a tear initiation point in the web, starting from which the web is torn or separated; this tear initiation point may have any shape or structure, comprising one or several holes and/or slits. The knife may thus comprise one or several needles and/or blades or the like; the blade may have a serrated or a straight profile; the knife section may comprise a plurality of knives, spaced apart along the direction of the flow of air. It should also be understood that the knife 13 may even not be necessary for very thin webs, e.g. web of a thickness less than 5 micrometers; for such webs, the mere tensioning of the web due to the accelerating section of the chopper is sufficient for breaking the web; the use of a knife is however preferable to ensure that parts of equal or similar length are produced.

The output of the knife section 12 is connected to an accelerating section 18, in which the speed of the web is increased, in the embodiment of FIG. 2, this accelerating section is formed of a Venturi effect nozzle, where the speed of the air transporting the web edge trim is accelerated on a short distance.

The accelerating section of the chopping device of the invention is not limited to such a Venturi device; it may use any type of accelerating means known per se to the person skilled in the art, such as rolls with a peripheral speed higher than the speed of the incoming web; another solution would be to use an additional injection of air, or a pulsating air supply in the accelerating section.

The accelerating section accelerates the speed of the incoming web; in the embodiment of FIG. 2, where the accelerating section comprises a Venturi effect nozzle, the accelerating section accelerates the speed of the air carrying the incoming web. If the web is air transported, the increase in the speed of the air is preferably between 10 to 200%; in the preferred embodiment, the speed is increased of 100% in the accelerating section; if the speed of the air in the input section is 60 m/s, the speed of the air in the ram accelerating section is preferably around 120 m/s.

Where accelerating rolls are used in the accelerating section of the chopping device, the peripheral speed of the rolls is also preferably 10 to 200% higher than the speed of the web inputted to the chopping device of the invention.

The operation of the chopping device of FIG. 2 is the following. An incoming edge trim travels beyond the input section and the knife section; the front end of the incoming edge trim then enters the accelerating section. Once a certain length of web has entered the accelerating section, the front edge of the web is accelerated, and as a result, the incoming edge is tensioned; it then contacts the knife present in the knife section, and is punctured or cut. The tear initiation point formed by the knife extends and a section of the web is thus separated, and further accelerated downstream of the chopping device. The new front end of the incoming section then enters the accelerating section, and the same process starts again.

For thin webs, if the device does not comprise a knife or puncturing means, the operation is the following; an incoming edge trim travels beyond the input section and the knife section; the front end of the incoming edge trim then enters the accelerating section. Once a certain length of web has entered the accelerating section, the front edge of the web is accelerated, and as a result, the incoming edge is tensioned; it is then torn off the rest of the edge trim, so that a section of the web is separated; this section is further accelerated downstream of the chopping device. The new front end of the incoming section then enters the accelerating section, and the same process starts again.

Thus, the chopping device of FIG. 2 ensures the cutting or chopping of the web into smaller sections or parts, without any moving knife or blade. Its operation is therefore more reliable than the prior art devices; it is also adapted to the cutting of webs of any thickness, including thin webs than cannot be processed in the prior art devices.

The length of the sections of webs chopped according to the invention is substantially constant, and notably, does not depend on the mechanical strength of the web or on the resistance to tearing of the web; with air speeds of 60 and 120 m/s, as exemplified above, the chopping device of FIG. 2 produces web sections, 90% of which have a length between 0.3 and 0.6 m. To further increase the precision in the length of the chopped sections of the webs, it is possible to provide additional air pulsating means 7 in the knife section, so that the web contacts the knife or knives at given time intervals; the operation of the device is substantially the same. Such air pulsating means also give a more equal distribution in the length of the chopped sections to a range of 0.4 to 0.5 m. It is also possible to use the air pulsed from such pulsating means for accelerating the web in the accelerating section of the chopper.

Figure 3:
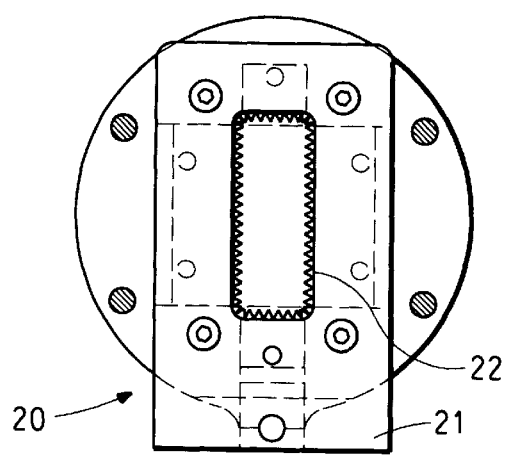
FIG. 3 is a front view of a fixed knife according to the invention.

FIG. 3 is a cross section of the chopping device of FIG. 2, in the plane A—A; it shows a front view of a knife 20, with the part of the knife section on which it is mounted. The knife 20 of FIG. 3 is formed in a plate 21, in the center of which a hole 22 is formed, e.g. by punching; the four edges of the hole 22 have a series of triangular needles; the hole 22 has a rectangular shape corresponding to the cross section of the input duct and of the accelerating duct. In the embodiment of FIG. 3, the area of the knife protruding in the duct represent around 10% of the cross section area of the duct.

It should be understood that the invention is not limited to the preferred embodiments described above. For instance, in the embodiments of FIGS. 2 and 3, the chopping device comprises a knife section, connected to an input section and to an accelerating section. Such a knife section may be comprised of the knife only; the knife could be mounted directly between the input section and the accelerating section; the assembly if FIG. 2 has the advantage of allowing a simple change of the knife, without making it necessary to dismount the input section or the accelerating section. The shape of the knife is not limited to the example of FIG. 3; the knife could for instance be a circular knife. The chopping device of the invention may be used not only for edge trims, but also for cutting into pieces or parts any type of web scrap.

What is claimed is:

1. A chopping device for thin webs, comprising
   an input section (10) for receiving the web to be chopped;
   an accelerating section (18) for accelerating the front end of the web received from the input section, while the remainder of the web is in the input section;
   at least one puncturing means (13, 20) for puncturing the web tensioned by the accelerating of its front end, located between the input section and the accelerating section, said puncturing means comprising at least one fixed knife (20),
   the chopping device having no moving knife or blade.

2. A chopping device according to claim 1 wherein the accelerating section (18) comprises an accelerating device selected from the group comprised of Venturi effect tubes, rolls, air injection accelerating devices.

3. A chopping device according to claim 1 further comprising air pulsing means for pulsing air at a puncturing means.

4. A chopping device according to claim 1 wherein the input section comprises air transport means.

5. A chopping device for thin webs, comprising an input section (10) for receiving the web to be chopped;

an accelerating section (18) for accelerating the front end of the web received from the input section, while the remainder of the web is in the input section;

at least one puncturing means (13, 20) located between the input section and the accelerating section and that is connected to the accelerating section, said puncturing means comprising at least one fixed knife (20), the chopping device having no moving knife or blade.

6. A chopping device according to claim 1 or 5, wherein said knife comprises a series of needles or blades.

7. A process for chopping thin webs using a chopping device comprising:

an input section (10) for receiving the web to be chopped;

an accelerating section (18) for accelerating the front end of the web received from the input section, while the remainder of the web is in the input section;

at least one puncturing means (13, 20) for puncturing the web tensioned by the accelerating of its front end, located between the input section and the accelerating section, a puncturing means comprising at least one fixed knife (20), the chopping device having no moving knife or blade comprising the steps of:

providing an incoming web;

accelerating the front end of the incoming web so as to tear off said front end from the remainder of the web, without moving any knife or blade.

8. A process according to claim 7, further comprising the step of causing the web to contact a puncturing means (13, 20).

9. A process according to claim 8, further comprising the step of pulsing air to cause the web to contact a puncturing means (13, 20).

* * * * *